US010122760B2

(12) United States Patent
Terrill et al.

(10) Patent No.: US 10,122,760 B2
(45) Date of Patent: Nov. 6, 2018

(54) COMPUTER NETWORK SECURITY SYSTEM

(71) Applicant: Drawbridge Networks, Inc., New York, NY (US)

(72) Inventors: John Ondy Terrill, New York, NY (US); Thomas James Cross, Atlanta, GA (US); Scott Michael Davis, Wantagh, NY (US); Qiu Zhang, Scarsdale, NY (US)

(73) Assignee: Drawbridge Networks, Inc., New York, NY (US)

( * ) Notice: Subject to any disclaimer, the term of this patent is extended or adjusted under 35 U.S.C. 154(b) by 128 days.

(21) Appl. No.: 15/144,702

(22) Filed: May 2, 2016

(65) Prior Publication Data

US 2016/0323318 A1 Nov. 3, 2016

Related U.S. Application Data

(63) Continuation of application No. PCT/US2016/030463, filed on May 2, 2016.

(60) Provisional application No. 62/155,145, filed on Apr. 30, 2015.

(51) Int. Cl.
*H04L 29/06* (2006.01)
(52) U.S. Cl.
CPC .......... *H04L 63/20* (2013.01); *H04L 63/0227* (2013.01); *H04L 63/1441* (2013.01)
(58) Field of Classification Search
CPC ...................................................... H04L 63/20
See application file for complete search history.

(56) References Cited

U.S. PATENT DOCUMENTS

| 8,001,610 | B1 | 8/2011 | Chickering et al. |
| 8,281,363 | B1 | 10/2012 | Hernacki et al. |
| 2002/0112155 | A1 | 8/2002 | Martherus et al. |
| 2003/0135603 | A1 | 7/2003 | Lin et al. |
| 2006/0212524 | A1 | 9/2006 | Wu et al. |
| 2008/0040790 | A1 | 2/2008 | Kuo et al. |
| 2008/0267201 | A1 | 10/2008 | Yang et al. |
| 2010/0205657 | A1 | 8/2010 | Manring et al. |

(Continued)

OTHER PUBLICATIONS

PCT/US2016/030463, "International Search Report and Written Opinion received for PCT Application No. PCT/US2016/030463, dated Jul. 28, 2016", dated Jul. 28, 2016.

*Primary Examiner* — Shawnchoy Rahman
(74) *Attorney, Agent, or Firm* — Morrison & Foerster LLP

(57) ABSTRACT

A computer network security system includes a central controller in communication with software-based endpoint agents operating on individual host computers. The endpoint agents monitor new connection requests to and from their respective hosts, comparing the connections to cached rules obtained from the controller, and holding new connections while escalating requests for applicable rules and/or directives to the controller in real-time when no applicable rules are available in their caches. The endpoint agents can be configured to present a pop-up dialog requesting enhanced authentication credentials from a user on a host in response to a connection request from a restricted network-based application. The pop-up dialog enables enhanced or two-factor authentication functionality to be overlaid on any networked application regardless of the application's inherent authentication capability.

30 Claims, 5 Drawing Sheets

(56) References Cited

U.S. PATENT DOCUMENTS

2012/0047483 A1* 2/2012 Amit ............... G06F 17/30861
                                                        717/104
2014/0237584 A1   8/2014 Cooper et al.
2016/0330183 A1* 11/2016 McDowell ............ H04L 9/321
2017/0289271 A1* 10/2017 Seed .................... H04L 67/148

* cited by examiner

COMPUTER NETWORK SECURITY SYSTEM

RELATED APPLICATIONS

The subject matter of this application is related to U.S. Provisional Application No. 62/155,145, filed on Apr. 30, 2015, which application is hereby incorporated by reference in its entirety.

BACKGROUND

In order to understand the utility of this invention and the role that it plays within a computer security program, it helps to provide some background regarding the process that sophisticated computer network attackers go through when intruding into a computer network from the Internet. When looking at the anatomy of an attack, there are several stages, including an initial point of compromise, an escalation of privileges, a pivot to other hosts, and eventually, data exfiltration. One objective of a computer security program is to prevent attackers from getting to the data exfiltration phase of their attack, and there are a variety of solutions on the market that attempt to stop attacks at each phase. No known solution to the computer security problem provides a comprehensive barrier to attackers.

First, consider the initial point of compromise. Often, the attacker exploits a technical flaw in software that a corporation is running on its endpoint workstations in order to get a first foothold on the corporate network. This could be a bug with a known remediation or patch for it, or this flaw could be unknown to the user and software creator—this is often referred to as a zero day vulnerability. The flaw may not even be technical in nature. Malicious attackers often target computers via social methods such as phishing or by directly attacking applications/servers. In either case, the attacker will coerce the user or application to run malicious code supplied by the attacker. This malicious code will often provide the attacker with control over that computer remotely, such as by opening remote administration of the computer.

Stopping this initial point of compromise can be challenging. While there are technical solutions, such as anti-virus, that look for known malicious files, often attackers are able to get around these solutions. Some of the protections get deployed directly on the endpoint workstation or host. Alternatives to traditional Anti-Virus (AV) include different techniques to keep malicious applications from running, such as application whitelisting, application reputation management, containerization of applications, and application behavioral analytics. Ultimately, however, attackers will often find a way to bypass these protections. For example, using packer/unpacker techniques, attackers can generate unique binaries to bypass AV. Attackers can run code in a pre-approved piece of software like python or a less obvious environment like a macro in excel to bypass application whitelisting. Attackers have multiple techniques for bypassing these technologies and they continue to develop more.

Considerable effort has also been placed into stopping the initial point of compromise at the internal network perimeter. Technologies like firewalls (layer 3/4 and layer 7) or Intrusion Prevention Systems are often used. These often look for known signatures of bad files being transferred over the network or for known malicious hosts attempting communication. Other products attempt to run downloaded files and open attachments to inbound emails in order to see if they are malicious. Trivial techniques such as delayed execution of malicious code can be used to bypass some of these technologies.

Overall, attackers have a number of methods to gain an initial point of compromise. We assume, therefore, that the attacker will ultimately get a foothold in a company's internal corporate network.

Once an attacker has executed their malicious code on an initial point of compromise, allowing for remote access to a computer within a network, the attacker will attempt to escalate their privileges on that computer. This escalation of privileges can be highly technical in nature and may exploit another local vulnerability, but it can also be the result of simple techniques such as password cracking.

Some endpoint security solutions attempt to stop or mitigate privilege escalation. Certain information security best practices can also make this step difficult for the attacker. Attackers, however, are often able to escalate privileges despite these barriers, and we further assume that attackers will be able to gain elevated privileges.

Once an attacker has gained elevated privileges on a computer in a company's corporate network, they will attempt to pivot onto other hosts on the network. Often, the first computer compromised does not have the access or information that the attacker is seeking. As a result, the attacker will attempt to connect to other computers on the network from their initial point of compromise, often using the privileges and access of the user, application, or device they initially compromised. This pivot step, or what is often referred to as lateral movement, typically leverages credential reuse where the attacker attempts to log in to a number of hosts using credentials stolen from the initial point of compromise or from other systems that are breached along the way. The pivot step can also exploit vulnerabilities in software running on internal hosts.

By impersonating users, applications, or devices, attackers can traverse an internal network compromising additional computers until they locate the information or access they seek. This traversal can be directed at specific valuable hosts such as a domain controller or file repository or more broad based where the attacker tries to infect as many hosts as possible. Additional compromise of computers will also allow the attacker to increase the access or credentials available to them.

Best practices to mitigate this lateral movement of the pivot step include segmenting an internal corporate network using firewalls or virtual LANs to break the network up into segments. The resulting segments would be configured with narrow access between each other, theoretically making it more difficult for attackers to access sensitive resources from less sensitive segments. For example, a segmented network could be configured such that certain desktop workstations on one segment are not able to log in to a production database on another segment. Segmenting an internal corporate network, however, is difficult in practice. The cost of segmenting networks in terms of the physical infrastructure work required as well as the potential disruption to day-to-day corporate business activities is very high, and as a result, many organizations have inadequate internal network segmentation.

Once an attacker has successfully found the information or access they were seeking, they will then send copies of that data to themselves. This is referred to as exfiltration and can vary in size depending on the information being sought. Data can be exfiltrated over the network or via other means, such as removable media. A number of solutions exist in the data leakage prevention space that are intended to prevent data exfiltration. As will be appreciated by one skilled in the art, however, existing solutions are being constantly tested by new attack techniques.

To investigate or identify breaches, some organizations use the NetFlow standard network protocol to gain visibility into internal network activity. On certain network switches, there exists an ability to send NetFlow data (metadata about the traffic going through the switch) to a 3rd party application/repository. NetFlow data can include information about what hosts are connecting to what other hosts. This information, in turn, can be used as an investigative tool, and if properly modeled, could also show unusual traffic connecting between hosts. This type of analysis, however, is merely investigative and cannot itself block traffic or enforce segmentation.

SUMMARY

A computer network security system includes a central controller in communication with software-based endpoint agents operating on individual host computers. The endpoint agents monitor new connection requests to and from their respective hosts, comparing the connections to cached rules obtained from the controller, and holding new connections while escalating requests for applicable rules and/or directives to the controller in real-time when no applicable rules are available in their caches. The endpoint agents can be configured to present a pop-up dialog requesting enhanced authentication credentials from a user on a host in response to a connection request from a restricted network-based application. The pop-up dialog enables enhanced or two-factor authentication functionality to be overlaid on any networked application regardless of the application's inherent authentication capability.

In one aspect, a computer security system includes: a plurality of host computers operating on at least one network, each host computer executing a respective endpoint agent configured to gate network connections; and at least one server computer operating on one or more of the at least one network, the at least one server computer executing a controller in network communication with each of the endpoint agents, wherein each endpoint agent is configured to, for a respective network connection: obtain metadata for the network connection, send a connection escalation request containing the obtained metadata to the controller, hold the network connection, preventing the passage of data, pending a response from the controller, receive a response from the controller including an action for handling the network connection, and handle the network connection in accordance with the action, and wherein the controller is configured to: maintain a plurality of rules that specify actions for handling network connections based on obtained metadata, receive connection escalation requests from the endpoint agents, match metadata received in the connection escalation requests with rules from the plurality of rules, and reply to the connection escalation requests with responses including actions for handling network connections based on the matched rules.

In one aspect, the computer security system can be configured such that the controller maintains a rules database for storing the plurality of rules.

In one aspect, the computer security system can be configured such that the controller includes rules logic for matching the received metadata against the plurality of rules.

In one aspect, the computer security system can be configured such that each endpoint agent: maintains a rules cache for storing some or all of the plurality of rules; and includes rules logic for matching obtained metadata with rules in the rules cache.

In one aspect, the computer security system can be configured such that each endpoint agent is further configured to: determine, for each network connection, whether the obtained metadata for the each network connection matches a rule in the rules cache; in response to determining that the obtained metadata for the respective network connection does not match a rule in the rules cache, send the connection escalation request containing the obtained metadata to the controller; and in response to determining that obtained metadata for another network connection does match a rule in the rules cache, handle the another network connection in accordance with an action specified by the matched rule.

In one aspect, the computer security system can be configured such that the response includes a rule specifying the action for handling the respective network connection.

In one aspect, the computer security system can be configured such that the response further includes a directive specifying the action for handling the respective network connection.

In one aspect, the computer security system can be configured such that another response received from the controller in response to another connection escalation request for another network connection: includes a directive specifying an action for handling the another network connection; and does not include a rule.

In one aspect, the computer security system can be configured such that the endpoint agent is further configured to cache, in the rules cache, the rule included in the response.

In one aspect, the computer security system can be configured such that the response includes a directive specifying the action for handling the respective network connection and does not include a rule.

In one aspect, the computer security system can be configured such that each endpoint agent is further configured to: set a timer in association with sending each connection escalation request; and upon expiration of the timer for another connection escalation request for another network connection, without having received a response from the controller, apply a failover rule for handling the another network connection.

In one aspect, the computer security system can be configured such that the metadata for the respective network connection includes a user identifier.

In one aspect, the computer security system can be configured such that at least one of the plurality of rules is configured to match based on the user identifier.

In one aspect, the computer security system can be configured such that each endpoint agent is configured to send periodic status reports to the controller.

In one aspect, the computer security system can be configured such that the controller is configured to send, and at least one of the endpoint agents is configured to receive, a list of hosts for which connections are to be blocked.

In one aspect, the computer security system can be configured such that the controller includes a management module and a plurality of caching nodes, wherein the management module includes a rules database and wherein each caching node is configured to receive connection escalation requests from and send responses to endpoint agents, other caching nodes, or both endpoint agents and other caching nodes.

In one aspect, the computer security system can be configured such that the plurality of caching nodes are distributed across a plurality of different computers.

In one aspect, the computer security system can be configured such that at least one of the plurality of caching nodes is configured to send connection escalation requests to and receive responses from at least one other caching node.

In one aspect, the computer security system can be configured such that at least one of the plurality of caching nodes: maintains a rules cache storing rules that match metadata and specify actions for handling network connections, and includes rules logic for comparing received metadata to rules.

In one aspect, the computer security system can be configured such that the rules cache for at least one of the plurality of caching nodes is configured to mirror the rules database of the management module.

In one aspect, the computer security system can be configured such that the action received in the response from the controller specifies that an enhanced authentication is required for a user and an application associated with the respective network connection, the application being a different application than the endpoint agent, and wherein to handle the action requiring enhanced authentication, the endpoint agent is further configured to: present a user interface to a user of a host computer on which the endpoint agent is operating, the user interface configured to obtain authentication credentials from the user; transmit the authentication credentials for authentication of the user for the application on the host; and receive an indication that the user has been authenticated for the application on the host.

In one aspect, the computer security system can be configured such that to handle the action requiring enhanced authentication, the endpoint agent is further configured to block the respective network connection.

In one aspect, the computer security system can be configured such that after receipt of the indication that the user has been authenticated for the application on the host, a subsequent connection for the user and the application on the host is allowed.

In one aspect, the computer security system can be configured such that to handle the action requiring enhanced authentication, the endpoint agent is further configured to hold the respective network connection pending receipt of the indication that the user has been authenticated on the host.

In one aspect, the computer security system can be configured such that the controller includes a management user interface, wherein the management user interface is configured to: display information representative of network traffic flowing between hosts on one or more of the at least one network; and receive input defining rules that match metadata and that specify actions for handling network connections.

In one aspect, the computer security system can be configured such that the plurality of host computers and the at least one server computer operate on a common protected internal network.

In one aspect, a method for gating computer network connections is performed by an endpoint agent executing on a host computer operating on a network, the endpoint agent being in network communication with a controller executing on at least one server computer. The method includes: obtaining metadata for a network connection; sending a connection escalation request containing the obtained metadata to a controller; holding the network connection, preventing the passage of data, pending a response from the controller; receiving a response from the controller including an action for handling the network connection; and handling the network connection in accordance with the action, wherein the controller is configured to: maintain a plurality of rules that specify actions for handling network connections based on obtained metadata, receive connection escalation requests from the endpoint agents, match metadata received in the connection escalation requests with rules from the plurality of rules, and reply to the connection escalation requests with responses including actions for handling network connections based on the matched rules.

In one aspect, the method can be performed such that the host computer includes a non-transitory computer readable medium encoded with instructions which, when executed by a processor on the host, cause the host computer to perform the method.

In one aspect, a method for gating computer network connections is performed by a controller executing on at least one server computer, the controller being in network communication with a plurality of endpoint agents, each endpoint agent executing on a host computer operating on a network. The method includes: maintaining a plurality of rules that specify actions for handling network connections based on obtained metadata; receiving connection escalation requests from the endpoint agents; matching metadata received in the connection escalation requests with rules from the plurality of rules; and replying to the connection escalation requests with responses including actions for handling network connections based on the matched rules, wherein each endpoint agent is configured to, for a respective network connection: obtain metadata for the network connection, send a connection escalation request containing the obtained metadata to the controller, hold the network connection, preventing the passage of data, pending a response from the controller, receive a response from the controller including an action for handling the network connection, and handle the network connection in accordance with the action.

In one aspect, the method can be performed such that the at least one server computer includes at least one non-transitory computer readable medium encoded with instructions which, when executed by at least one processor on the at least one server computer, cause the at least one server computer to perform the method.

DETAILED DESCRIPTION

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices, components, and methods to those described herein. In other instances, well-known devices, components, and methods have not been described in detail so as not to unnecessarily obscure aspects of the present invention.

Overview

Figure 1:
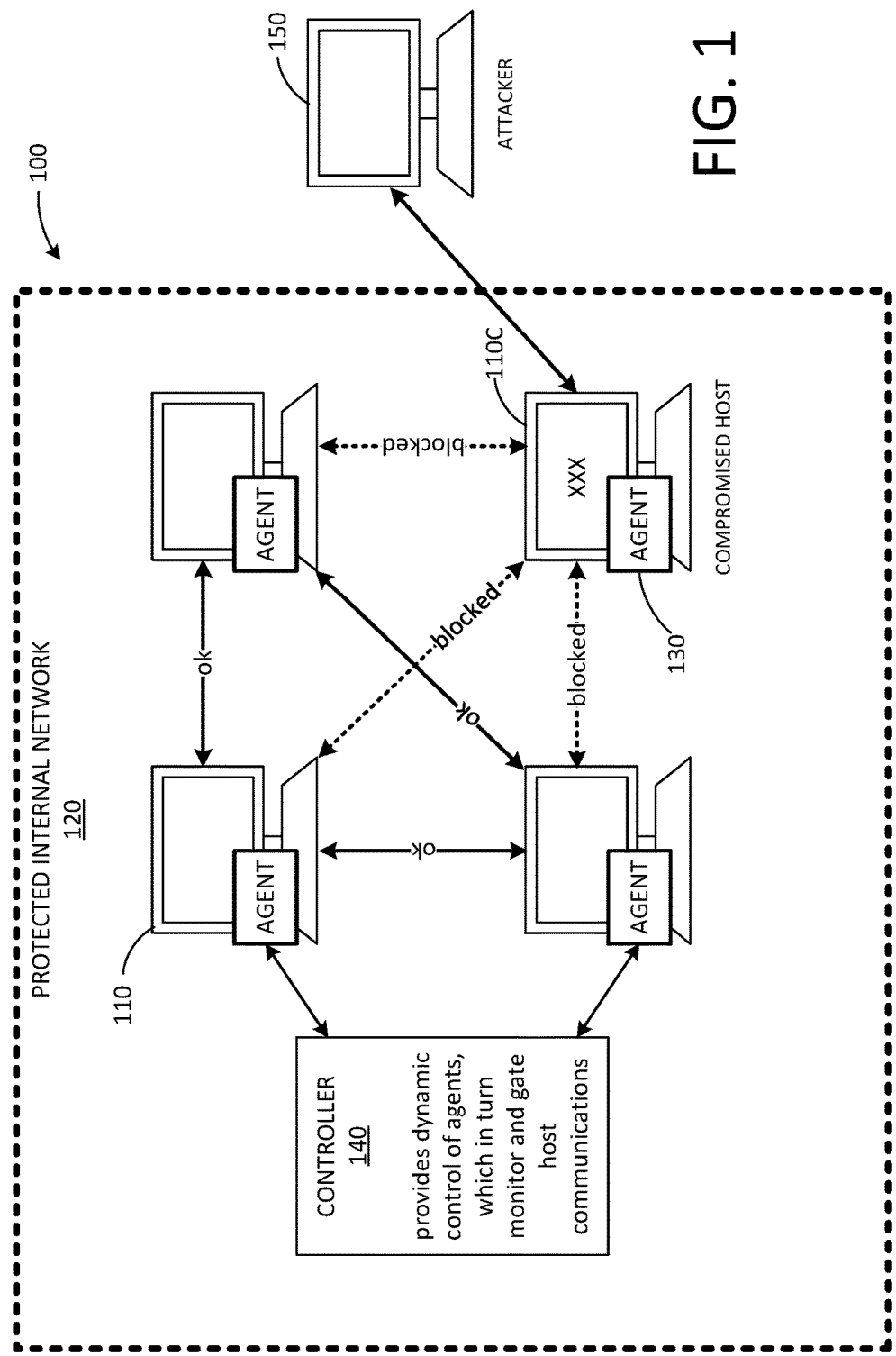
FIG. 1 illustrates an overview of a computer network security system in accordance with one embodiment.

FIG. 1 illustrates an overview of a computer network security system 100 in accordance with one embodiment. The system 100 includes a plurality of endpoint host computers 110 (each of which will be referred to herein as a "host"). Each host 110 can be, for example, a workstation, a hardware server, or any other computing device. The hosts 110 can be connected by and within a protected internal computer network 120. The network 120, in turn, is typically connected to the Internet through and protected by one or more hardware firewalls (not shown).

Each host 110 is configured to operate an endpoint agent 130, which can be a software application that monitors and gates host communications based on rules and instructions provided by a central controller 140. The controller 140, which is configured to control and manage the endpoint agents, can be a stand-alone service that receives data from agents 130 as connections are initiated. The controller 140 can be implemented as one or more software applications executing on one or more hardware servers, hosts or other computers on the network 120.

The controller 140 can be configured to provide dynamic control of agents 130 so that requests for network connections to or from any host 110 can be analyzed by the controller and responded to on the fly, in real-time, as will be discussed in further detail below. The controller 140 can also be configured to request or gather status reports from hosts 110 in order to maintain a map and/or log of various resources operating on the network 120, as will be discussed in further detail, below. The controller 140 can further be configured, in conjunction with the agents 130, to enforce enhanced authentication policies, as will be discussed in more detail below. Additional functionality that can be supported by the controller will also be discussed below.

The security system 100 can provide network administrators with increased visibility into their internal corporate network as well as improved management and control over that network so that segmentation can be performed at a more fine-grained level and at a lower cost. In accordance with certain embodiments, the granularity of control achieved can be described as dynamic micro-segmentation, since communications between any two hosts, both on the sending and receiving sides, can be dynamically monitored and gated. The system 100 can be configured, in effect, to create a virtual overlay of separate network segments within existing networks, which enables greater security benefits than traditional networking equipment such as firewalls, switches and routers.

The functionality of the agent 130 differs substantively from a local or host-based firewall in how it interacts with connections and receives policy. Local firewalls typically have local policy that is set once with minimal changes over time. The agent 130, on the other hand, first checks metadata for every new connection request against a local cache of rules. If a temporarily or permanently cached rule applies, the agent handles the connection in accordance with the cached rule, such as by allowing or blocking the connection. If no entry applies, however, the agent 130 sends the metadata to the controller 140 in a connection escalation request to see if the controller has an applicable rule or policy, while the agent 130 holds the connection request, pending a response. The controller 140, in turn, can respond with a directive instructing the agent 130 how to handle the connection request. The controller 140 can also include with the response a rule applicable to the connection request to be cached for future use. Alternatively, the controller 140 can be configured to respond with an applicable rule for the agent 130 to cache and apply to the connection request. The controller 140 can also indicate, when sending a rule, an amount of time for which the rule should be cached by the agent 130. The amount of time can be determined universally, by groups of rules, or on a rule-by-rule basis and can be configurable by an administrator, determined based on an automated analysis or both.

The endpoint agent 130 and controller 140, accordingly, can be configured such that the agent 130 checks local policy first, and then escalates connection requests to the controller 140 if no local policy or rule applies. The system 100, therefore, enables a global policy to be dynamically created, modified, and enforced in real-time.

The system 100 can also be configured to handle failures, such as when the agent 130 cannot contact the controller 140, when the controller does not respond promptly, or when the controller fails altogether. In the case of a failure and when no cached local rule applies, the agent can be configured to apply a backup or failover rule or set of rules. A single backup rule can be configured to "fail open," meaning allow all connections or "fail closed," meaning block all connections. A more extensive backup set of rules can alternatively be defined and saved or cached on the agent to handle failures. In order to identify failures, such as due to network congestion, the agent can initiate a timer when sending a request to the controller. If the agent does not receive a response before the timer expires, the agent can then implement a backup rule or set of rules. In one embodiment, the timer is set to expire at 10 seconds. In some embodiments, the timer value can be configurable by an administrator user. In some embodiments, different timers can be used to detect failures in different parts of the transaction between the agent 130 and the controller 140.

In the case where a connection is made between two hosts 110 that are both running the endpoint agent 130, the endpoint agent running on each host 110 checks the connection. The connection will thus be checked twice, once when leaving outbound from the first host and once when arriving inbound to the second host. Configuring the system 100 to perform checking at both the originating and destination hosts for a connection provides redundancy that addresses the situation where an attacker may have compromised the agent on only one side of a connection.

The metadata that the agent 130 compares against its cache of rules and can send to the controller 140 can include some or all of the following, for example:

Process ID (of the sending process for outbound connections, of the receiving process for inbound connections)

Process Name (of the sending process for outbound connections, of the receiving process for inbound connections)

Source IP Address

Destination IP Address

Source Port

Destination Port

Connection Timestamp

User ID (of the sending user for outbound connections, of the receiving user for inbound connections).

Using the metadata fields, rules can be configured to match on one or more of the fields, possibly ignoring altogether one or more other fields. A rule could be configured, for example, to match on only a User ID (the user's identity) such that connections are handled (e.g. allowed or blocked) based only on the identity of the user, as opposed to, for example, the source or destination IP address.

If a rule on the controller or cached by an agent matches the metadata for a new connection request, the rule and/or a directive sent by the controller 140 to the agent 130 can be configured to specify an action for handling the connection. Possible actions can include some or all of the following, for example:

Allow—allow a connection

Deny—block a connection

Divert—redirect an incoming or outgoing connection from or to another host, for example, by rewriting the packets or using encapsulation to tunnel the traffic Sling Shot—similar to divert action, but uses a third host to serve as an intermediary in diverting traffic.

The controller 140, in addition to replying to connection escalation requests for specific new connections, can also send general directives to endpoint agents 130. The general directives need not be responsive to a specific connection request and can be cached by the agent 130 for permanent, specified or variable amounts of time to apply to future connection requests. General directives can include some or all of the following, for example:

Quarantine—block all connections to, from, or both to and from a specified host

Monitor—instructs the agent to locally record all interactions with a particular host—which interactions can be subsequently reported to the controller Notify—instructs the agent to launch a local process to display information to a user or request information from the user, e.g. in a pop-up window (which can be used to effect enhanced or two-factor user authentication)

Black list—block all connections to, from or both to and from a list of specified hosts, updating or overwriting prior black lists White list—allow all connections to, from or both to and from a list of specified hosts, updating or overwriting prior white lists.

Referring again to FIG. 1, the system 100 is shown to illustrate a situation where an attacker 150 has compromised one of the hosts 110C. The attacker 150 has likely caused connection requests from the host 110C to be generated that fall outside the range of allowed connections. In this case, certain connections from or to the host 110C can be blocked by the agent 130 based on cached rules or the controller 140 sending directives to the agent 130. The connections can be blocked either at the compromised host 110C or at other hosts in the internal network 120. At some point, a human administrator or the controller 140, by automated analysis, may determine that the host 110C has actually been compromised by an attacker, in which case the controller can be configured to quarantine the host 110C by providing rules directing other hosts not to accept incoming connections from or initiate outgoing connections to the host 110C. When quarantining the host 110C, the controller can choose to block or not to block connections using the agent 130 at host 110C depending on whether the controller 140 or its administrators want to effectively alert an attacker to the fact that its connections are being blocked at the host 110C itself. If outgoing connections from the compromised host 110C are not blocked, the connection attempts will merely not be responded to by other hosts that the attacker 150 is attempting to connect to in accordance with the quarantine instruction to those other hosts, without necessarily alerting the attacker 150 to the fact that it has been discovered.

The Controller

Figure 2:
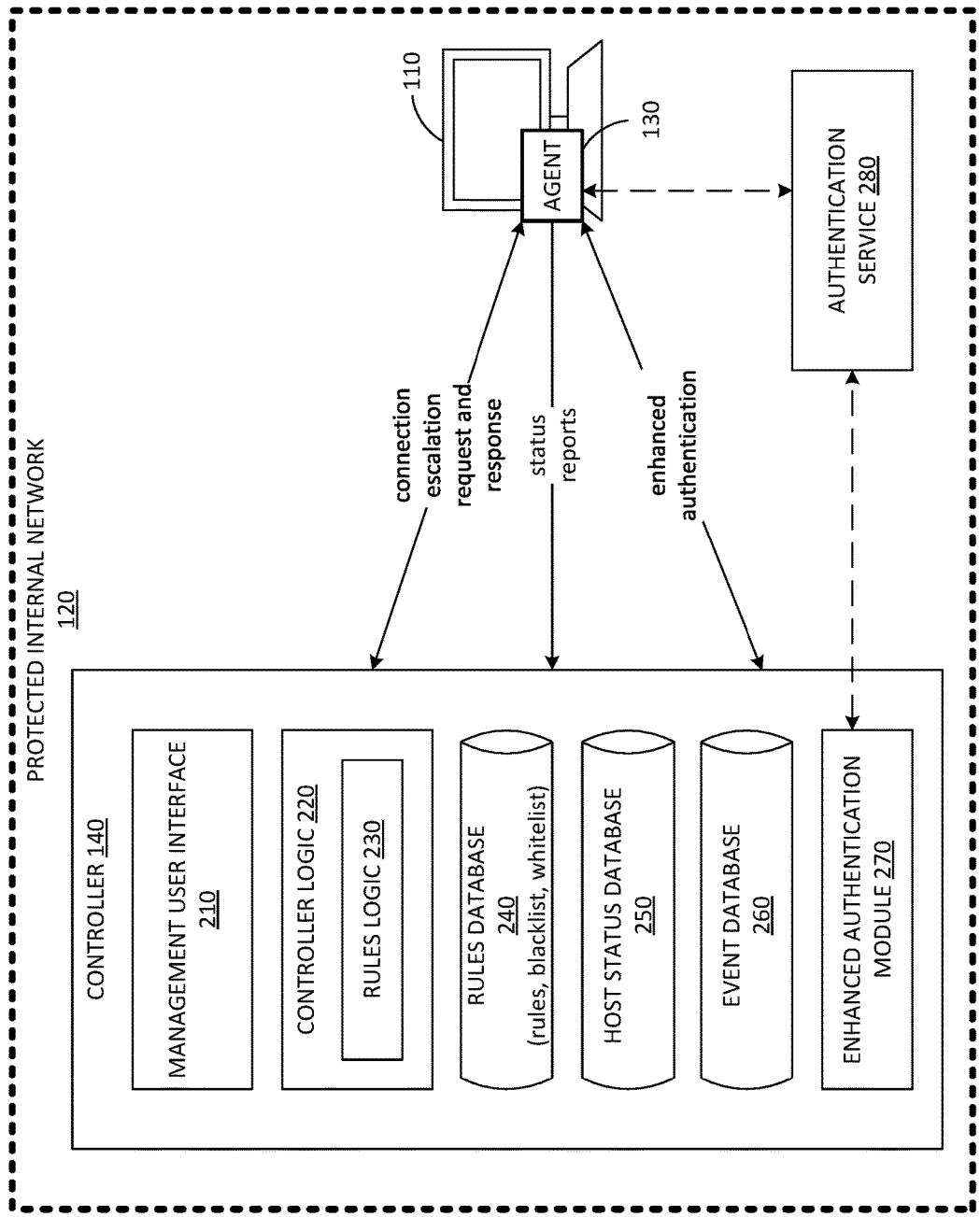
FIG. 2 illustrates a detail view of the controller, showing components and functionality within the context of the internal network and in relation to a host and its associated agent.

FIG. 2 illustrates a detail view of the controller 140, showing components and functionality within the context of the internal network 120 and in relation to a host 110 and its associated agent 130. As indicated above, the controller 140 can be implemented as one or more software applications executing on one or more hardware servers. The hardware servers can include one or more hosts or other computers operating on the network 120. The controller 140 can be configured to include a user interface as well as a service that can receive and reply to incoming messages from agents 130, model and classify data, and create and enforce policy. The controller 140 can be configured to handle connection escalation requests and responses, status reports, and enhanced authentication requests (discussed in additional detail below) from the agents 130. Messages exchanged with the agents 130 can be implemented using different formats, such as HTTP requests.

The controller 140 receives data from agents both in the form of periodic status reports and escalation requests. This data allows for the controller to create a graph of the internal network 120 and network activity attributable to hosts, users, and applications. This data can be additionally enhanced with identity group data, which can be retrieved from Microsoft Active Directory or another identity management service. Using this data, the controller can identify unique behaviors between users in a similar user group.

Based on the data collected by the controller 140, rules for the system 100 can be crafted manually, by human administrators, or automatically, such as by the controller 140 using machine learning techniques. Rules can be crafted, for example, based on a general premise that internal network traffic tends to be fairly deterministic and can be an accurate proxy for normal or non-nefarious user and application behavior. Traffic that conforms to such rules can be allowed. Traffic that falls outside of such rules can, therefore, be identified as exceptions and targeted for additional scrutiny or blocked. For example, an analysis of normal and usual traffic patterns can be used to create rules that, when implemented by the system 100, effectively segment an internal network to as fine a degree as desired, even down to the individual host level.

The controller 140 can include a management user interface 210, through which an administrator user can review network configurations and/or manage the controller. The management user interface 210 can be configured to display a graph of the internal network 120 and display traffic flowing between hosts. The management user interface 210 can also provide a graphical view to allow administrators to select relevant hosts, host groups, users, and user groups in order to create access control policies which can be implemented through the controller's rules. The management user interface 210 can provide controls for an administrator to manually organize hosts, IP addresses, and users into groups. The administrator can also define groups based on certain characteristics, such as IP address ranges or the specific or general software running on a particular endpoint. For example, an administrator might group all mail servers into one group and all web servers into another group. The management interface 210 can be access controlled such that only authenticated administrators can access the user interface.

The controller 140 can also include controller logic 220, which can be one or more software or code modules that implement various functions and functionality of the controller. The controller logic 220 can include rules logic 230, which can be one or more software or code modules configured to apply the system's rules to metadata for connection requests. The rules logic 230, in turn, can be configured to access rules, stored in a rules database 240 and based upon which connection decisions are made by the controller 140 and agents 130. The rules database 240 can be configured to store, in addition to rules to be applied to individual connection requests, whitelists and black lists that can be maintained and propagated to individual agents 130 for cache storage. The rules database 240 can also be configured to include a set of catch-all rules for escalation requests for which no other applicable rules are identified. The rules database 240 can also include backup or failover rules that are transmitted to agents 130 for use when the controller cannot be reached.

When the controller 140 receives a connection escalation request from an agent 130, the rules logic 230 can use the information in the escalation request to look up a corresponding rule in the rules database 240. As discussed above, the information included in the escalation request can be metadata about the connection request, such as source and/or destination IP addresses and ports, timestamps, process ID, and user ID, in addition to information about the agent 130 or host 110, such as an agent ID of the requesting agent 130. The rules logic 230, in turn, matches the received metadata about the connection request against rules in the rules database 240, to determine what rule and/or directive to send back to the requesting agent 130. The controller 140, for example, can determine which rules apply to an escalation request from a host 110 based on which user is authenticated to the host at a particular time and what software it is running, since IP addresses and user authentications can change in real time.

The controller 140 can be configured to send a rule, a directive, or both a rule and a directive back to a requesting agent 130 in response to an escalation request. In the case that the controller responds with a directive, the agent can merely implement the directive. In the case that the controller responds with a rule, the agent can apply the applicable rule, optionally caching the rule for future use. In the case that the controller sends both the directive and the rule, the agent can implement the directive and cache the rule.

The agents 110 can be configured to send and the controller 140 can be configured to receive, by way of the controller logic 220, periodic status reports providing information about hosts on the internal network 120. In one embodiment, each agent 130 is configured to send a report to the controller 140 upon startup, upon the agent 130 detecting changes on the host 110, upon request from the controller 140, and otherwise every 12 hours, although other frequencies can be used. The controller 140, in turn, can be configured to store or update the data received in the status reports in a host status database 250. The information received in the reports and stored in the host status database 250 can include, for example:

host hardware configuration (such as computer make, model, serial number, installed peripherals)

installed software (including operating system, user software and installed updates)

services running on host and/or being offered to network antivirus and firewall configurations network interface information (such as what is included in escalation requests)

authenticated users agent status connection request logs (incoming, outgoing or both).

The host status database 250 can also or alternatively be configured to store the white lists and black lists of hosts that are periodically sent to the agents 130.

The controller 140 can also include an event database 260, which stores indications of events, such as connection requests, occurring on the network. The event database can be populated based on information received in the escalation requests from the agents 130. Agents 130 can also or alternatively be configured to report connection request logs (incoming, outgoing or both) separately or as part of their status reports to the controller 140. The host status database 250 and the event database 260 can optionally be combined or integrated, along with other databases, such as the rules database 240, in a single functional database.

The controller logic 220 can include a learning mode that can uses the information stored in the host status database and/or the event database 260 to generate a topology of existing connectivity between hosts and groups of hosts. The topology can establish, for example, that a particular host has been seen connecting to another host on a particular port, such as a workstation connecting to an internal web server on TCP port 80 or an IMAP mail server on TCP port 143. An administrator can explore this topology using the user interface 210 to investigate the relationships between hosts, users, and groups on the network. The topology can also be used to create or serve as an initial whitelist of known good connections between hosts.

The user interface 210 can provide, leveraging data from the databases 240, 250, and 260, a list of hosts that have been observed on the network, which allows an administrator to investigate details about those hosts, including behavior, installed software, and other characteristics. The administrator can prompt the controller 140 to quarantine a specific host or perform other special actions for that host, such as traffic redirection.

An administrator user can use the management user interface 210 and/or the controller logic 220 to import learned connections, optionally extracted from the databases 240, 250 and 260 into a policy as rules to be stored in the rules database 240. The administrator can also manually create custom policy rules. Each policy rule can instruct the system 100 to allow, deny, or prompt other behaviors (such as enhanced or 2-factor user authentication) whenever traffic is seen between hosts, groups of machines, users, groups of users, or IP address ranges on particular ports and protocols that match the rule. For example, a policy rule could state that traffic from a particular user group to a list or range of particular IP addresses on a certain TCP port should be blocked using a Deny directive, discussed above. In accordance with one embodiment, the controller 240 enforces the policy rules by using them to respond to connection escalation requests from agents 130.

The controller 140 can be configured to automatically assign hosts, IP addresses, and users into groups based on their characteristics and behavior, such as what IP addresses they use, what software they use, or what services they offer. Machine learning functionality can be used to automatically group similar hosts and users together based on common connection patterns, behaviors, and other characteristics. Such machine learning techniques can be used to construct policies at scale.

The default behavior for the policy for a particular group of hosts or users can be defined by choosing a setting for that group such as, for example, "locked down," "alerting," or "disabled." When a group of hosts or users is "locked down," any traffic to or from that group that is not explicitly allowed by a rule in the policy is denied and blocked. When a group is "alerting," traffic that is not explicitly allowed can be highlighted in the controller management user interface 210 as potentially suspicious, but it is not blocked. When a group is set to "disabled," by default, traffic is allowed without alerting, or the decision about what to do can be based on a more general "default" policy rule that can be defined by an administrator. Different settings can be chosen for inbound and outbound traffic to and from each group.

The controller 140 can also be configured to send policy rules, independent of any escalation request, to any agent or agents 130 periodically or at any point in real-time. The agents, in turn, can cache and use the supplied rules to evaluate future connections without communicating with the controller. Communications between the controller and agents can be encrypted and/or authenticated.

The controller logic 220 can include a scripting engine (not illustrated), that can be exposed to the user administrator through the user interface 210 to support advanced grouping and analysis. The scripting engine can expose additional controller logic functionality such as additional grouping, different behavior for certain traffic patterns, and organization specific information. For example, the scripting engine can be configured to support scripts that can assign hosts to a particular group if they are in a certain IP address range, or if they run particular software, or if they offer certain services, or any combination thereof. The scripts can be implemented in JavaScript in one embodiment. When a script is executed, it can be configured to runs once for every host that the controller knows about. The script can call JavaScript methods that allow it to access any information about the current host that is stored in the controller's database including all of the individual information fields that have been sent to the controller in status reports from the host, or in connection escalation requests from the host. Each script can use information obtained from the databases to decide what groups to assign the host to, and returns a list of groups that the host should be added to. Once a script has been run for a particular host, the controller can take the list of groups returned by the script and add the host to all of those groups. Scripts can be added, removed, modified, and potentially shared between different administrators of the system.

As mentioned above, the controller 140 and agents 130 can be configured to support enhanced authentication policies. By gating network access to network-based services or from requesting hosts, any network-based application can be secured based on an escalated or enhanced authentication implemented through the controller 140 and agents 130. The controller 140 can be configured, in conjunction with the agents 130, to enforce enhanced authentication policies that override or supplement any existing or application-specific authentic policies for network-based applications by gating network access to or from such applications contingent on an elevated authentication process. The controller can instruct an endpoint agent 130 to pop up a window and to interact with the user in response to a connection, which can challenge the user to perform a multi-factor authentication before allowing the connection to proceed.

In one embodiment, the controller includes an enhanced authentication module 270 that manages enhanced authentication of users using hosts 110. When enhanced authentication is specified for a network-based application, the agent 130 can be provided with a rule that indicates that authentication is required. When a user initiates a request that matches the rule, the agent then checks with the controller and/or in its rules cache to determine whether the requesting user has been authenticated on the host. If not, the agent blocks network communications from that application. When such a communication is blocked, the agent 130 can present a pop-up dialog on the host's screen, prompting the user to authenticate into any appropriately configured authentication service 280. After the user is successfully authenticated, and this is recognized by the controller 140 and/or the agent 130, the user's subsequent attempts to access the service will be permitted. In certain embodiments or configurations, the agent 130 can be configured to hold network communications from an unauthenticated user, rather than blocking them, until after successful authentication, at which point the held communications can be released. The amount of time for which an authentication can be valid can be a configurable setting and the status of a user having been authenticated for a certain service on a certain host can be cached on that host's agent.

The authentication service 280 can be any desired authentication service, such as a customized internal authentication service, a standard off-the-shelf authentication system, or a third party service such as RSA's SecurID two-factor token-based authentication service. The pop-up dialog box can be configured, for example, to identify the name of the application for which authentication is being requested, as well as an opportunity for the user to supply authentication credentials, such as a username, a password, and optionally data from a two-factor authentication token, such as a SecurID code or a smart-card.

The agent 130 can be configured to interface directly with the authentication service 280, passing authentication credentials supplied by the user (e.g. through the pop-up dialog box), on to the authentication service. The authentication service, in turn, can return an authentication token or ticket, which the agent can then optionally pass on to the controller for caching in the enhanced authentication module 270 and/or the host status database 250 to indicate that a certain user has been authenticated on a certain host. The agent, in response to subsequent requests by an authenticated user to access the service, receives an indication back from the controller indicating that the user has been authenticated. The indication can be optionally cached by the agent and the agent can allow the user's network traffic to or from the application to pass, thereby permitting the authenticated user access to the application.

The agent can alternatively or additionally be configured to pass authentication credentials received from a user on to the controller 140, which in turn can then pass the credentials on to the authentication service 280. The authentication service response is then returned to the controller and cached in the enhanced authentication module 270 and/or the host status database 250 to indicate that the user has been authenticated on the host. A directive can then be sent back to and cached by the host 110 indicating that the user's connection requests for the application at issue can be allowed.

The enhanced authentication module makes it easier for a network administrator to require enhanced or multi-factor authentication for access to a service running on their network. Multi-factor authentication challenges also help to establish context for a network connection, to ensure that the connection was initiated by a real human user and not malicious software running in the background on their computer.

In addition to using pop-ups to effect enhanced authentication, a similar pop-up technique can be used to gather structured, unstructured or free-form data requested from users. It may be the case that a user is attempting to access a certain network-based service. A rule can be configured to cause the agent 130 to pop up a dialog that poses a question to the user such as "Why are you requesting access to the employee personal information database?" The pop-up can include a free-form text entry box prompting the user for a response, which can in turn be sent to the controller 140, logged and then reviewed by an administrator.

The controller 140 can also be configured to integrate with user access control systems, for example, by calling Active Directory or other authentication services directly, or by receiving authentication data from agents. For example, when an agent sends a connection escalation request to the controller, the controller can be configured to verify the validity of the request, including the user of the process that is initiating the connection. To do this, the controller can be configured to interface with a central authentication service, such as Active Directory, to verify data in the request, such as the user. This user data allows the controller to map users to the hosts those users are authenticated to and actively using. By doing this, the controller can organize the information that it has learned about endpoint connectivity by user and user group, as well as by hosts and groups of hosts.

Endpoint agents 130, as noted above, can be installed on each endpoint host 110 that the system 100 supports. The agents 130 can intercept network traffic as the host is initiating outgoing connections or accepting incoming connections. In accordance with one embodiment, all intercepted traffic is compared to a local instance of the currently known rules for that agent. If no entry exists, the agent 130 will make a request to the controller 140 to determine what action it should take.

The Endpoint Agent

Figure 3:
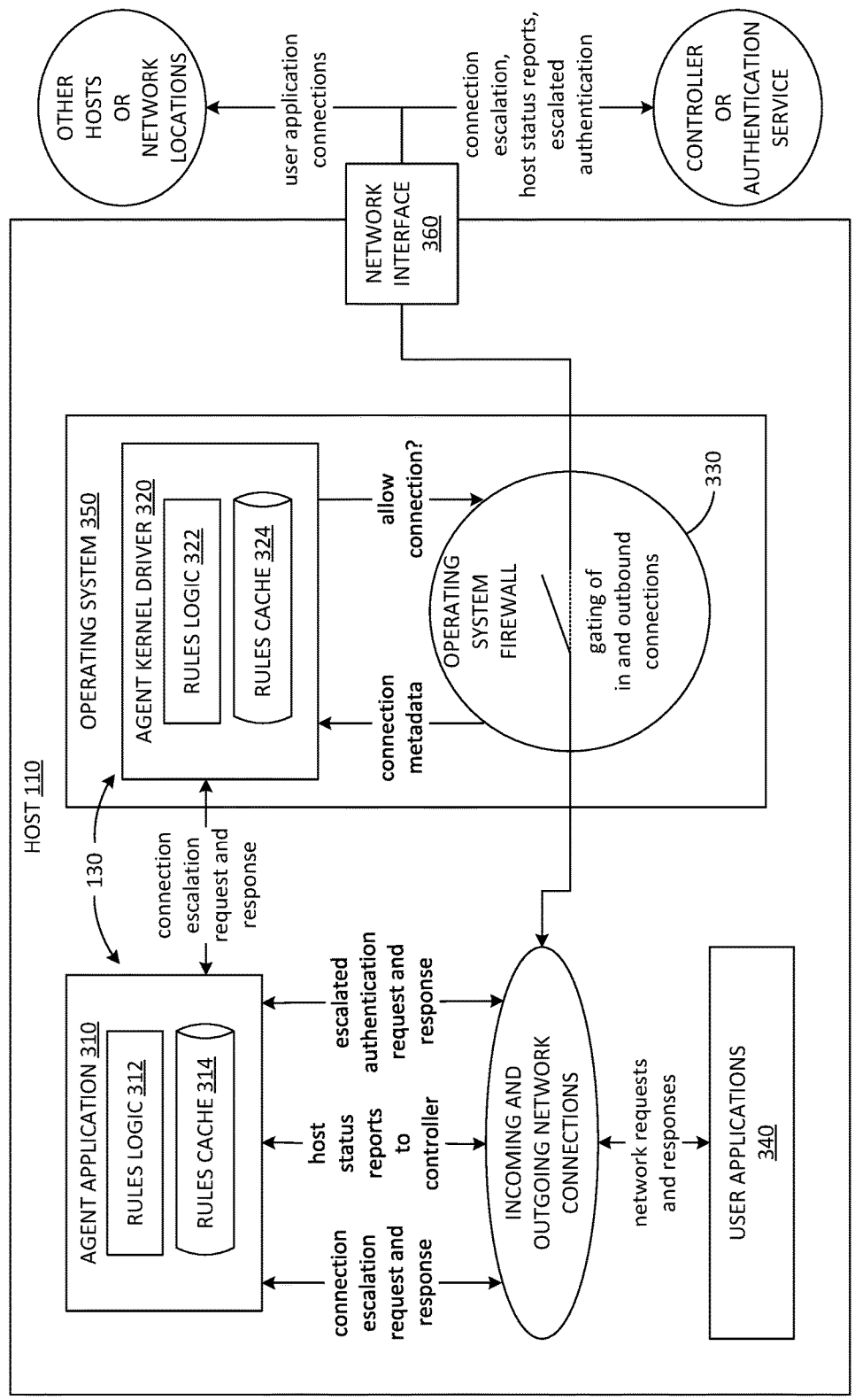
FIG. 3 illustrates an implementation of an agent including an agent application and an agent kernel driver operating on a host computer in accordance with one embodiment.

FIG. 3 illustrates an implementation of an agent 130 including an agent application 310 and an agent kernel driver 320 operating on a host computer 110 in accordance with one embodiment. The agent kernel driver 320 can be embedded directly within the host's operating system space to provide access to and control over network connections while the agent application 310 can be installed within the host's user application space to act as an intermediary between the kernel driver 320 and the controller 140.

In one embodiment, the kernel driver 320 accesses and controls network connections through an application program interface (API) of the operating system's firewall 330. Many popular operating systems provide integrated firewall functionality that can be accessed through an API. For example, Microsoft Windows provides such an API through the Windows Filtering Platform and Mac OS (OS X) provides an API through the Socket Filters. Network connections can be initiated by user applications 340, pass through the firewall or can be received by the operating system 350 through a network interface 360.

The endpoint agent 130, the agent application 310 and/or kernel driver 320 can be configured to hold connections, preventing the passage of data into or out of the host 110, until an action for handling the connection has been determined. The holding and subsequent action for handling connections can be effected, for example, through the API of the firewall 330.

The kernel driver 320 can use the firewall 330 to obtain metadata (such as process ID/name, source/destination IP addresses and ports, timestamp, as noted above) for new connections. For each new connection, the kernel driver's rules logic 322 checks the metadata against rules stored in the kernel driver's rules cache 324. If a cached rule applies to the metadata, the kernel driver applies the action specified by the rule (e.g. allow or block) by sending an instruction to the firewall 330. The firewall 330, in turn, implements the actual instruction by directly blocking, allowing or otherwise handling the new connection in accordance with the action.

In the case that the kernel driver's rules cache 324 does not contain an applicable rule, the driver can send a connection escalation request, including the connection metadata, to the agent application 310. The agent application, in turn, uses its rules logic 312 to check the supplied connection metadata against its rules cache 314, to determine what rule and/or directive to send back to the kernel driver. Similar to the controller, discussed above, the agent application can be configured to send a rule, a directive, or both a rule and a directive back to the kernel driver in response to an escalation request. In the case that the agent application responds with a directive, the kernel driver can merely implement the action specified by the directive. In the case that the agent application responds with a rule, the kernel driver can apply the applicable rule, optionally caching the rule for future use. In the case that the agent application sends both the directive and the rule, the kernel driver can implement the action specified by the directive and cache the rule.

In the case that the agent application's rules cache 314 does not contain an applicable rule, the agent application can send a connection escalation request, including the connection metadata, to the controller 140, which can respond as described above. The agent application 310 and the kernel driver 320 can be configured to cache received rules for predefined or configurable periods of time. In one embodiment, the agent application is configured to cache rules for 5 minutes, while the kernel driver is configured to cache rules for 30 seconds.

The agent application 310 can also be configured to handle failures, such as when it cannot contact the controller 140, when the controller does not respond promptly, or when the controller fails altogether. In the case of a failure and when no cached local rule applies, the agent application 310 can be configured to apply a backup or failover rule or set of rules.

Some operating systems may not support use of an agent kernel driver 320 within the operating system. In these configurations, the functionality of the agent kernel driver can be incorporated into the agent application 310 which runs in user space and interfaces with available APIs to implement the same functionality. For example, in a Linux implementation, the agent application 310 can be configured to access the API of libnetfilter to interact with the networking stack and no kernel driver need be used. In Chromium, the agent application 310 can be configured to access the chrome.webRequest API.

In one embodiment, the agent application 310 caches black lists and white lists received from the controller without expiration or until updated lists are received from the controller. The agent can be configured to block requests to/from any hosts included on its black list and allow requests to/from any hosts on its white list without the need to send a connection escalation request to the controller. The agent application 310, in addition to exchanging connection escalation requests and responses with the controller 140, can be configured to send periodic status reports to the controller 140.

The agent application 310 can be configured to handle rules that require enhanced authentication of a user using an application on the host 110. As discussed above, when a rule requiring enhanced authentication is applied, the agent application 310 can cause a pop-up dialog box to appear on the host's user interface. User credentials can be requested and then passed on through a network connection, either to the controller 140 or to an authentication service. If the agent application 310 interacts directly with the authentication service, it can receive an authentication token, which it can pass up to the controller 140 to indicate a status of a user as authenticated on the host. Otherwise the controller can interact with the authentication service directly to complete the authentication. Upon a subsequent connection escalation request from the agent application 310, after the user has been recognized by the controller as authenticated, the controller can reply with a rule and/or an indication that the user has been authenticated, which the agent application 310 can cache in its rules cache 314. The agent application can then allow connections by the user using the application.

Depending on the specific configuration and implementation, the rules caches of the agent application 310 and kernel driver 320 may need to be populated with a rule that allows communications between the agent application 310 and the controller 140, since such communications may need to pass through the operating system firewall. In particular, in Windows and Linux implementations, a permanent rule can be installed in the operating system firewall to allow connections by the agent application 310. In Mac OS (OS X), a special entry can be made in the kernel driver 320 to allow connections by the agent application 310.

Caching Nodes

Figure 4:
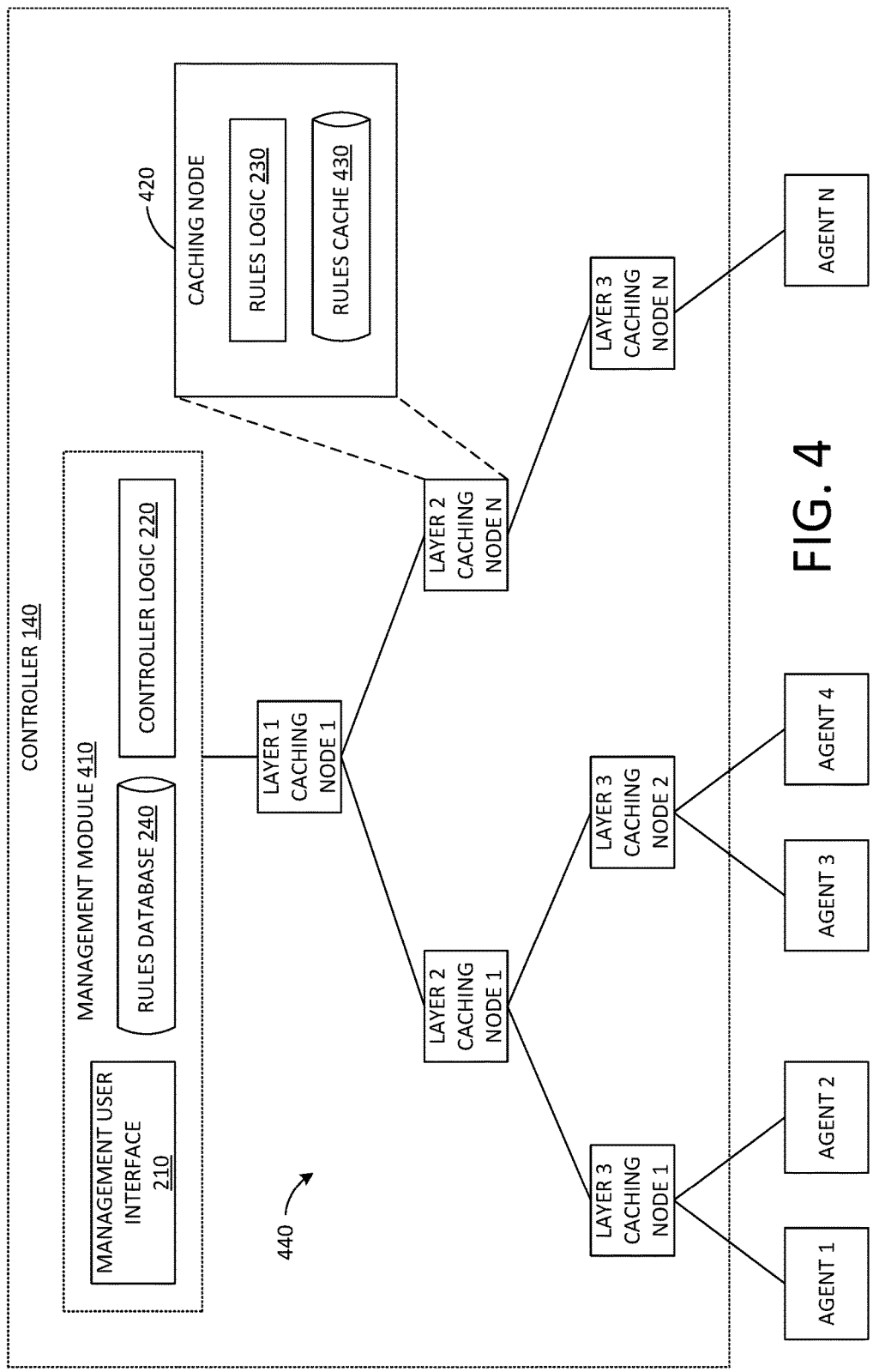
FIG. 4 illustrates an overview architecture of the system in accordance with an embodiment configured for scalability incorporating caching nodes.

FIG. 4 illustrates an overview architecture of the system 100 in accordance with an embodiment configured for scalability incorporating caching nodes 420. To improve scalability, the functionality of the controller 140 can be distributed across multiple computing resources, such as in a cloud based, networked computing or distributed computing configuration. In accordance with certain embodiments, some components of the controller can be incorporated into a management module 410, such as the management user interface 210, the rules database 240 and some of the controller logic 220. Other functionality, such as the rules logic 230 can be scaled by replication across a number of caching nodes 420. Each caching node 420 can include its own rules cache 430, which functions similarly to the rules cache 314 of the agent application 310, but serves multiple agents 130.

The caching nodes 420 can be arranged, for example, in a hierarchical fashion with multiple layers, as shown in FIG. 4, where requests and responses are passed from agents 130, through caching nodes lower in the hierarchy up through caching nodes higher in the hierarchy. Caching nodes can be configured to receive and reply to messages from agents or lower level nodes and can deserialize the messages and reserialize them in a network efficient manner before forwarding them on to a higher level node.

At any caching node 420, similar to the controller 140, discussed above, the caching node uses its rules logic 230 to check an escalation request's supplied connection metadata against its rules cache 430 to determine what rule and/or directive to send back to the requesting node or agent. In the case that the node's rules cache 430 does not contain an applicable rule, the node can send another connection escalation request, including the connection metadata, to a node at the next level up in the hierarchy, until an applicable rule is found. Similarly, the caching nodes can be configured to handle enhanced authentication requests, for example, by integrating with two factor authentication systems. The caching nodes can be configured to prompt agents to authenticate users and verify authentication information with a two factor authentication system. The caching nodes can be configured to funnel status reports received from agents 130 up through the hierarchy in a scalable manner.

Rules and/or policy can be cached at each caching node as a result of receiving a response to an escalation request from a node higher in the hierarchy or based on instructions or directives from higher nodes to push certain rules or policies down to nodes lower in the hierarchy. Rules that are received in response to escalation requests can be cached for variable or predetermined amounts of time (e.g. 1 day, 1 week, 1 month) or semi-permanently (e.g. based on storage availability by flushing least recently used rules). Policy, such as black lists and white lists or universally applicable rules, can be pushed down through the hierarchy until it reaches the endpoint agents 130 and maintained for specified amounts of time, indefinitely or until overwritten.

The caching nodes 420 can be organized into a caching hierarchy 440 that can multiplex connections from a large number of agents on a single computer, thus allowing the system to scale. This can be achieved through a three level multiplexer. The third level receives connections from agents 130 on a particular TCP or UDP port and forwards them to the second level, which can be on a different TCP or UDP port. Many copies of the second level can run in parallel on a particular computer system on different ports. Each second level instance receives messages from many agents 130 and sends them up to the first level over a single connection. The first level receives and processes messages from many second stage instances. Thus, connections from a large number of agents can be funneled up into a single node. Decisions about a particular message can be made at any caching level and replies sent from that level, instead of forwarding the message further up the chain.

The caching nodes 420 can be configured to interact with authentication services such as Active Directory in order to receive user identity information. The caching nodes can be configure to keep track of which rules in a policy apply to a particular host in real time based on which users are authenticated to that host and what software it is running as IP addresses and user identities change. The caching nodes can be configured to forward the Active Directory tree and other authentication information up to the controller management module 410 so that this information can be used to create policies.

One or more of the caching nodes 420 positioned at a top level with respect to the management module 410 can be configured to mirror or include all of the rules in the rules database 240. The caching nodes can be configured in different configurations, possibly with only a single level, such as a flat or star configured architecture where the caching nodes may all have direct links to the management module 410 and/or where the caching nodes cache all the rules in the rules database 240. In various configurations, the management module 410 and one or more caching nodes 420 can be configured to operate all on a single computer, on multiple computers or on one or more virtualized computing resources.

Deployment

Deployment can involve setting up a controller and installing software agents on endpoint servers and workstations. The controller can be set up either as a virtual machine, a hardware appliance, or installed on a preexisting computer.

The software agents can be manually installed on machines (desktops, laptops, servers, virtual machines, etc.) provided the operating system is supported. These can also be distributed to a large number of machines at once using configuration management software such as GPO or SCCM in Microsoft environments or Chef or Puppet in Linux. Casper, a JAMF product, can be used for Apple Mac OS (OS X) mass deployments.

The agents can be deployed with relevant information in either a registry setting or configuration file allowing the agent to know critical information such as the location and port of the controller to talk to. The agent will start connecting to the controller whenever new inbound or outbound connections occur that it does not already have a valid rule for and will respect the directives returned from the controller. By default, the controller can be configured to collect data from endpoint agents and reply to them with directives that the connections are to be allowed.

Once many endpoints on the enterprise network have software agents installed, data will start to feed into the controller over time providing a rich graph of the activity on the network.

Once the data is sufficiently rich enough (this is subjective to the environment), the administrator of the controller can start to manually build groups. These groups can associate users, machines, and processes with common relevant traits. Such traits can include, for example, user group, application access rights, and physical location. The interaction between these groups shows up as learned behavior in the administration console for the controller and can be escalated to become policy which the agents will then enforce.

Groups can be automatically created by scripts that build groups using heuristics of different network characteristics. This could be as simple as associating hosts that serve common known destination ports. For example, all servers that listen to TCP port 80 can be put in the webservers group. This can also be as complex as using machine learning to automatically group hosts or users based on common connection and behavior patterns. User groups can also be imported automatically from identity sources. Once groups are imported, the controller can keep the associations in sync with the originating source.

Individual policy rules can be created that either allow or deny traffic to and from particular groups. In addition, the default behavior for a particular group can be defined, which can govern the policy for any connection that does not fit a more specific rule. The normal default behavior for a group can be to allow traffic, and can be used for a learning/discovery phase of policy building. The network administrator can then define individual rules that allow traffic that is authorized to flow to and from that group, with the understanding that unexpected traffic will be allowed due to the default behavior of that group. Once the expected traffic for that group has been defined, the default behavior for unexpected traffic can be changed to either an altering or enforcement mode. The different modes allow for creating rules over time and safely testing rules to ensure not just their effectiveness, but to ensure they do not create a risk of blocking necessary traffic.

The ability to engage in enterprise network segmentation in waves, host group by host group, differs from traditional firewall segmentation projects, as those projects require physical network changes that can affect large numbers of hosts at the same time, and they often force the network administrator to figure out all of the policy rules that will be needed for all of the hosts in a particular section of the network before they can put any enforcement into place.

Alternative Embodiments

In accordance with certain embodiments, to handle mobile or portable computing devices such as portable computers or smartphones, the controller 140 can be configured to be accessible from outside the protected internal network 120. Mobile or portable computing devices can also or alternatively be configured to access the controller 140 when joined to the protected internal network via a virtual private network. Mobile or portable computing devices can also or alternatively be configured with limited agent functionality that implements enhanced authentication and sends status reports but do not control or report on network connections.

In accordance with certain embodiments, the system 100 can be configured to operate without a protected internal network 120. For example, the controller 140 can be made accessible from hosts 110 directly on the Internet, with the controller providing control over those hosts activities on the Internet itself. In addition or alternatively, one or more of the hosts, the controller or servers on which the controller is operating can be operating on different networks that are in network communication. For example, some hosts can be operating on a first network, other hosts can be operating on a second network and servers on which the controller is executing can be operating on a third network. The first, second and third networks can all be connected, for example, through a fourth network or through the Internet.

In accordance with certain embodiments, the system 100 can be configured such that the agent kernel driver 350, the agent application 310, the agent 130, and/or the caching node 420 does not include rules logic and/or a rules cache. In such configurations, when the rules logic and/or rules cache is not included in one or more of the foregoing components such components can be configured to pass or funnel escalation requests up to the controller without analysis. The controller, or an upstream component, will then respond with a directive specifying the action to take for the connection at issue. In the case that the agent 130 does not include a rules cache or rules logic, the agent can be configured to hold all new connections pending a response from an upstream component, such as a caching node 420 or the controller 140. In this case, the agent 130 can be configured to set one or more timers to handle failures, as discussed above, upon the expiration of which the agent can default to one or more failover rules. Failover rules can include rules such as fail open (allow all connections) or fail closed (block all connections, except to upstream components such as caching nodes or the controller).

In accordance with certain embodiments, the agent 130 can be instantiated or implemented on networking hardware, such as switches and/or routers. Each host 110 that does not have its own installed agent, which may be some or all of the hosts, can be connected through a direct route to a network node that has an installed agent. The installed agent on the network node, therefore, can monitor all communications to and from each host connected to the node. In such configurations or in other embodiments, the controller and caching layer can interact with native networking equipment that speak protocols for software defined networking. This can include proprietary protocols or open ones such as OpenFlow.

System Advantages

The system 100 can be used to achieve different goals for network and security organizations in their fight against threats. Various goals that can be addressed by various embodiments are discussed below.

Network Segmentation—Point to point segmentation of a network can be achieved with granular rules allowing computers to explicitly communicate with each other. Endpoint agents can deny access to computers that do not have permission to communicate, effectively segmenting a network. This can be done in software on by endpoint agents and does not require changing existing network switches, routers, firewalls, wiring, or configuration. Segments can be created based on user and user group in addition to or instead of network address. Therefore, two users can be sitting side by side on the same network segment and have access to different resources on the network because they work on different teams and are subject to different policies.

Network Behavior Modelling—By capturing authentication data such as a user's identity and computer that they are authenticating to, a controller can learn behavior for that user and computer. This behavior can allow for creating a policy for enforcement based on "whitelisting" known good user behavior. This behavior creates a base line to determine potentially malicious behavior as an exception to the learned "good" behavior.

Asset Identification and Management—Tracking a computer's connectivity, services, and user interactions allows for understanding many, if not all, of the network devices in an organization. This provides up to date and real time identification of these devices. If a given device is associated with or accessed by a specific user, it is possible to then ask that user questions about the device, which is helpful if the device is unknown or unmanaged.

High Level Threat Modelling—The point to point connectivity between computers can be visualized as a graph, which allows an automated analysis to determine the order in which computers must be accessed by an attacker in order to traverse from one place to another within the network. This graph can be tagged to show the importance, sensitivity, and susceptibility to attack for a given vertex in the graph. Traversing the graph in different directions can provide a mechanism for understanding the computers that must be compromised in order for an attacker to access important or highly sensitive data/machines.

Incident Response—The addition of endpoint agents to a computer allows for a controller to notify an endpoint host to change behavior if it detects a computer may be compromised. This can be achieved by changing a computer's ability to send and/or receive data. These changes can be as simple as not allowing any traffic, such as by quarantining the machine off the network, or more complex, such as limiting the traffic to a specific list of safe destinations, requiring additional two-factor authentication, prompting the user to answer questions, or diverting traffic into a separate part of the network for additional analysis, such as with a honey pot. The endpoint agents can also be instructed to record all interactions with a particular computer for future analysis.

Attacker Intelligence Campaigns—Defending a network sometimes requires more than just blocking malicious network traffic from attacking computers. It can also require the ability to collect information about what an attacker is looking for. The ability to control the access that an endpoint computer has to other computers in the network allows a compromised computer to be contained without completely disconnecting it from the network. In addition, as mentioned in the section on incident response capability above, defenders using the system will have an ability to divert traffic on the fly to an area of the network where the attacker's behavior can be safely monitored and controlled. Using these capabilities, the attacker can be observed, the attacker's motives can be determined, and potentially fake or misleading information can be supplied to the attacker.

Two Factor Authentication Enablement—Enabling two factor authentication in software applications can be a complex and onerous task. The system can reduce the complexity associated with the use of two factor authentication by providing a single solution that can force users to use two factor authentication when making any network connection to any destination that is designated as sensitive or privileged. This provides a "step-up" authentication capability that can provide the user with access to more resources than would usually be available to them based on their regular credentials or access to the network. The ability to threat model certain services, hosts, and users can provide the relevant information to determine when a user should be prompted to authenticate. The system can require two factor authentication on the fly for particular users in response to threat conditions.

Indication of Compromise Reporting—When a computer's behavior violates the known good policy, not only will the network be able to stop this traffic as mentioned in the section on network segmentation, the system can also provide the user id and process that initiated the connection. This understanding of the process can provide valuable information in understanding what malicious tools are being used to attack the network. This information is referred to as an Indication of Compromise (IOC). IOCs can be input into other tools to perform either manual or automatic searches. The system can also receive IOCs, such as IP addresses, from other tools to look for matches. An administrator user can manually search for network IOCs such as IP addresses using the topology view in order to see what hosts within the network are communicating with known points of compromise. The controller can import IOCs from remote data sources such as threat feeds in order to cross reference them against the activity that the system is observing in the user's network.

Traffic Diversion—On the fly traffic diversion can be requested. This allows one computer running the agent to send traffic to its intended destination via an intermediary computer. This intermediary computer can be strategically chosen based on the shortest available route through the physical network. By routing traffic through this intermediate computer, the data being transmitted will traverse an additional inspection point such as, full packet capture, deep packet inspection or intrusion prevention devices.

Additional Functionality

End to End Encryption—The agents can be configured to receive a directive to encrypt a connection as they start up. This will allow both sides of a connection to have transparent encryption without the underlying software needing to be aware. The controller can include cryptography capabilities to manage and distribute encryption keys.

DNS Capture—The agents can capture the content of connections to DNS servers to allow for resolving traffic either internally or externally. This information can be sent to the controller to allow for additional mapping of connectivity and it can indicate suspicious connections either internally or to the Internet.

Process Flow—The agents can be configured to watch the order in which a process spawns additional processes. This feature is useful during incident response operations when attempting to retroactively determine how a computer may have been infected.

Agent File Searching—The agents can be configured to have additional capability to search the local computer for files. This can occur when a new directive is returned to the agent in response to a connection request. The purpose of this functionality is to locate common files (and file IOCs) already detected as being suspicious or malicious on another host.

Deep Inspection—The agents can be configured to receive a new directive to start sending copies of packets being sent out by the computer to a second destination. This will allow for on-the-fly full packet capture and will enable an administrator of the controller to look at the content of network connections to identify potentially malicious traffic.

File Tagging—The agent can be expanded to inspect files as they are created, deleted, copied, etc. sending data about the file to the controller. The controller can keep a list of the files and their movement across a local file system and the network. The controller can then use information about user behavior to learn the intended access rules for the inspected files. This method can be referred to as dynamic information flow tracking but would be done across the network as files are sent between endpoints.

Load Balancers—The controller may need to be able to query certain networking devices to match two sides of a connection when IP addresses are translated. This is common for proxies, load balancers, etc. and may require the controller to be able to query the network devices or receive and interpret logs from those devices. Additionally, it is possible in certain network devices to share policy to create additional enforcement points. In those cases, the controller may push policy rules down to those devices in order to control access, in a format supported by the device.

Example Computer

Figure 5:
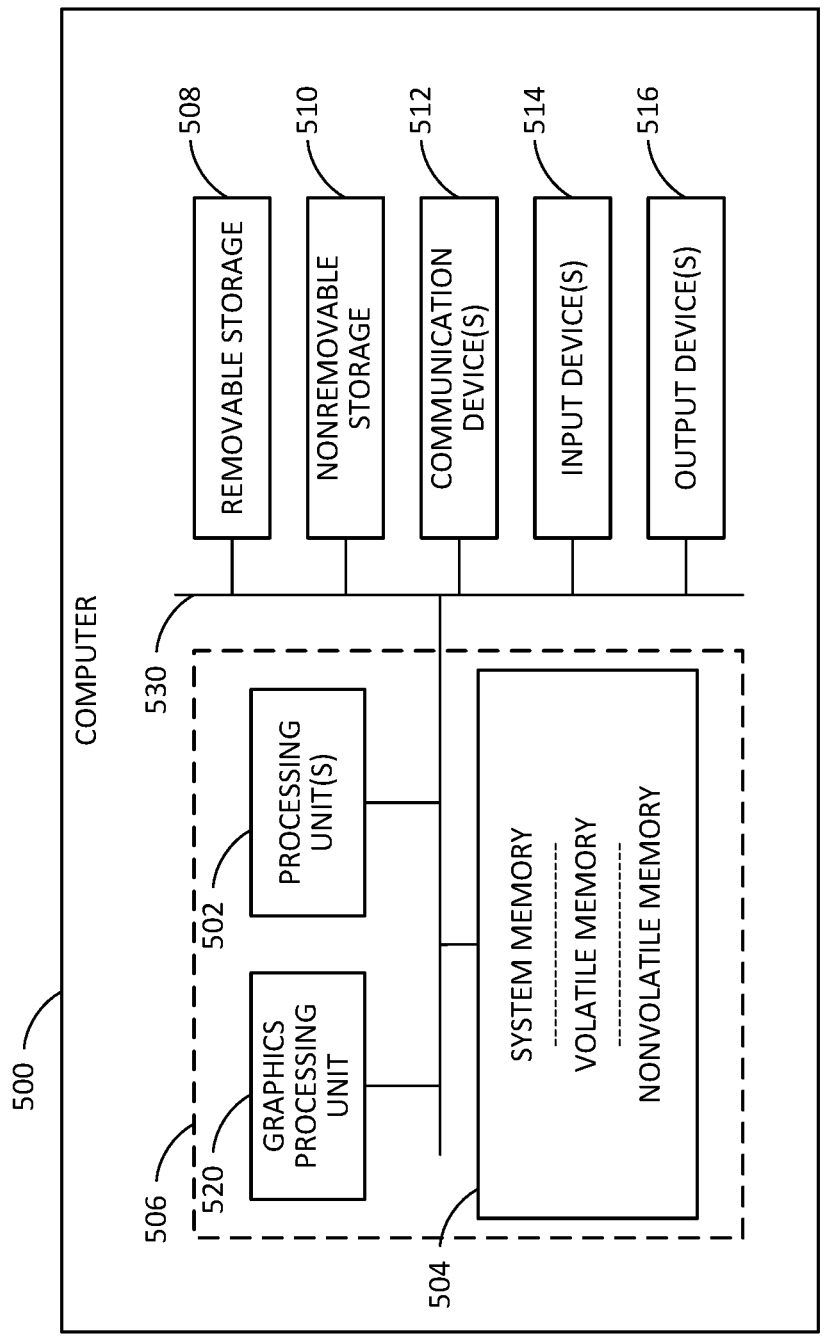
FIG. 5 illustrates an example computer, variations of which can be used to implement the host, the controller and the caching nodes.

FIG. 5 illustrates an example computer 500, variations of which can be used to implement the host, the controller and the caching nodes. Components of the embodiments disclosed herein, which may be referred to as modules, engines, processes, functions or the like, can be implemented by configuring one or more instances of the example computer using special purpose software or applications, possibly in different configurations and optionally networked, as a computer system. The computer 500 can be any of a variety of general purpose computers such as, for example, a server, a desktop computer, a laptop computer or a mobile computing device.

On a general purpose computer, a processor typically executes computer programs which include an operating system and applications. The operating system is a computer program running on the computer that manages access to various resources of the computer by the applications and the operating system. The various resources generally include memory, storage, communication interfaces, input devices and output devices.

With reference to FIG. 5, the example computer 500 includes at least one processing unit 502 and memory 504. The computer can have multiple processing units 502 and multiple devices implementing the memory 504. A processing unit 502 can include one or more processors or processing cores (not shown) that operate independently of each other. Additional co-processing units, such as graphics processing unit 520, also can be present in the computer. The memory 504 may include volatile devices (such as dynamic random access memory (DRAM) or other random access memory device), and non-volatile devices (such as a read-only memory, flash memory, and the like) or some combination of the two. This configuration of memory is illustrated in FIG. 5 by dashed line 506. The computer 500 may include additional storage (removable and/or non-removable) including, but not limited to, magnetically-recorded or optically-recorded disks or tape. Such additional storage is illustrated in FIG. 5 by removable storage 508 and non-removable storage 510. The various components in FIG. 5 are generally interconnected by an interconnection mechanism, such as one or more buses 530.

A computer storage medium is any medium in which data can be stored in and retrieved from addressable physical storage locations by the computer. Computer storage media includes volatile and nonvolatile memory devices, and removable and non-removable storage media. Memory 504 and 506, removable storage 508 and non-removable storage 510 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 500 may also include communication device(s) 512 through which the computer communicates with other devices over a communication medium such as a computer network. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals.

Communications device(s) 512 can include, for example, a network interface or radio transmitter, that interface with the communication media to transmit data over and receive data from signals propagated through communication media. The communication device(s) 512 can include one or more radio transmitters for telephonic communications over cellular telephone networks, and/or wireless connections to a computer network. For example, a cellular connection, a Wi-Fi connection, a Bluetooth connection, and other connections may be present in the computer. Such connections support communication with other devices, such as to support voice or data communications.

The computer 500 may have various input device(s) 514 such as a keyboard, mouse, touchscreen and pen, image input devices, such as still and motion cameras, audio input devices, such as a microphone, and various sensors, such as accelerometers, thermometers and magnetometers. Output device(s) 516 such as a display, speakers, printers, and so on, also may be included.

The various storage 510, communication device(s) 512, output devices 516 and input devices 514 can be integrated within a housing of the computer, or can be connected through various input/output interface devices on the computer, in which case the reference numbers 510, 512, 514 and 516 can indicate either the interface for connection to a device or the device itself as the case may be.

An operating system of the computer typically includes computer programs, commonly called drivers, that manage access to the various storage 510, communication device(s) 512, output devices 516 and input devices 514. Such access generally includes managing inputs from and outputs to these devices. In the case of communication device(s), the operating system also may include one or more computer programs for implementing communication protocols used to communicate information between computers and devices through the communication device(s) 512.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs may be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs).

CONCLUSION

Although the invention has been described in terms of certain embodiments, other embodiments that will be apparent to those of ordinary skill in the art, including embodiments which do not provide all of the features and advantages set forth herein, are also within the scope of this invention. Accordingly, the scope of the invention is defined by the claims that follow. It should be understood that the subject matter defined in the appended claims is not necessarily limited to the specific implementations described above. The specific implementations described above are disclosed as examples only. In the claims, the term "based upon" shall include situations in which a factor is taken into account directly and/or indirectly, and possibly in conjunction with other factors, in producing a result or effect. In the claims, a portion shall include greater than none and up to the whole of a thing; encryption of a thing shall include encryption of a portion of the thing. In method claims, any reference characters are used for convenience of description only, and do not indicate a particular order for performing a method.

The invention claimed is:

1. A computer security system comprising:
    a plurality of host computers operating on at least one network, each host computer executing a respective endpoint agent configured to gate network connections; and
    at least one server computer operating on one or more of the at least one network, the at least one server computer executing a controller in network communication with each of the endpoint agents,
    wherein each endpoint agent is configured to, for a respective network connection:
        obtain metadata for the network connection,
        determine whether the obtained metadata matches any rule in a rules cache maintained at the endpoint agent,
        in response to determining that the obtained metadata does not match any rule in the rules cache, send a connection escalation request containing the obtained metadata to the controller to obtain an action for handling the network connection,
        hold the network connection, preventing the passage of data, pending a response from the controller,
        receive the response from the controller including the action for handling the network connection,
        cache in the rules cache a rule including the action received from the controller to handle future network connections having the obtained metadata, and
        handle the network connection in accordance with the action, and
    wherein the controller is configured to:
        maintain a plurality of rules that specify actions for handling network connections based on obtained metadata,
        receive connection escalation requests from the endpoint agents,
        match metadata received in the connection escalation requests with rules from the plurality of rules, and
        reply to the connection escalation requests with responses including actions for handling network connections based on the matched rules.

2. The computer security system of claim 1, wherein the controller maintains a rules database for storing the plurality of rules.

3. The computer security system of claim 2, wherein the controller comprises rules logic for matching the received metadata against the plurality of rules.

4. The computer security system of claim 1, wherein each endpoint agent:
    maintains the rules cache for storing some or all of the plurality of rules; and
    comprises rules logic for matching the obtained metadata with rules in the rules cache.

5. The computer security system of claim 4, wherein each endpoint agent is further configured to:

in response to determining that obtained metadata for another network connection does match a rule in the rules cache, handle the another network connection in accordance with an action specified by the matched rule.

6. The computer security system of claim 1, wherein the response includes the rule specifying the action for handling the respective network connection and includes an amount of time to cache the rule in the rules cache at the endpoint agent.

7. The computer security system of claim 6, wherein the response further includes a directive specifying the action for handling the respective network connection.

8. The computer security system of claim 7, wherein another response received from the controller in response to another connection escalation request for another network connection:
   includes a directive specifying an action for handling the another network connection; and
   does not include a rule.

9. The computer security system of claim 1, wherein the response includes a directive specifying the action for handling the respective network connection and does not include a rule.

10. The computer security system of claim 1, wherein each endpoint agent is further configured to:
    set a timer in association with sending each connection escalation request; and
    upon expiration of the timer for another connection escalation request for another network connection, without having received a response from the controller, apply a failover rule for handling the another network connection.

11. The computer security system of claim 1, wherein the metadata for the respective network connection comprises a user identifier.

12. The computer security system of claim 11, wherein at least one of the plurality of rules is configured to match based on the user identifier.

13. The computer security system of claim 1, wherein each endpoint agent is configured to send periodic status reports to the controller.

14. The computer security system of claim 1, wherein the controller is configured to send, and at least one of the endpoint agents is configured to receive, a list of hosts for which connections are to be blocked.

15. The computer security system of claim 1, wherein the controller comprises a management module and a plurality of caching nodes, wherein the management module comprises a rules database and wherein each caching node is configured to receive connection escalation requests from and send responses to endpoint agents, other caching nodes, or both endpoint agents and other caching nodes.

16. The computer security system of claim 15, wherein the plurality of caching nodes are distributed across a plurality of different computers.

17. The computer security system of claim 15, wherein at least one of the plurality of caching nodes is configured to send connection escalation requests to and receive responses from at least one other caching node.

18. The computer security system of claim 15, wherein at least one of the plurality of caching nodes:
    maintains a rules cache storing rules that match metadata and specify actions for handling network connections, and
    comprises rules logic for comparing received metadata to rules.

19. The computer security system of claim 18, wherein the rules cache for at least one of the plurality of caching nodes is configured to mirror the rules database of the management module.

20. The computer security system of claim 1, wherein the action received in the response from the controller specifies that an enhanced authentication is required for a user and an application associated with the respective network connection, the application being a different application than the endpoint agent, and wherein to handle the action requiring enhanced authentication, the endpoint agent is further configured to:
    present a user interface to a user of a host computer on which the endpoint agent is operating, the user interface configured to request and obtain authentication credentials from the user;
    transmit, to the controller, the authentication credentials for authentication of the user for the application on the host; and
    receive, from the controller, an indication that the user has been authenticated for the application on the host.

21. The computer security system of claim 20, wherein to handle the action requiring enhanced authentication, the endpoint agent is further configured to block the respective network connection.

22. The computer security system of claim 20, wherein after receipt of the indication that the user has been authenticated for the application on the host, a subsequent connection for the user and the application on the host is allowed.

23. The computer security system of claim 20, wherein to handle the action requiring enhanced authentication, the endpoint agent is further configured to hold the respective network connection pending receipt of the indication that the user has been authenticated on the host.

24. The computer security system of claim 1, wherein the controller comprises a management user interface, wherein the management user interface is configured to:
    display information representative of network traffic flowing between hosts on one or more of the at least one network; and
    receive input defining rules that match metadata and that specify actions for handling network connections.

25. The computer security system of claim 1, wherein the plurality of host computers and the at least one server computer operate on a common protected internal network.

26. A method for gating computer network connections, the method performed by an endpoint agent executing on a host computer operating on a network, the endpoint agent being in network communication with a controller executing on at least one server computer, the method comprising:
    obtaining metadata for a network connection;
    determining whether the obtained metadata matches any rule in a rules cache maintained at the endpoint agent;
    in response to determining that the obtained metadata does not match any rule in the rules cache, sending a connection escalation request containing the obtained metadata to a controller;
    holding the network connection, preventing the passage of data, pending a response from the controller to obtain an action for handling the network connection;
    receiving the response from the controller including the action for handling the network connection;
    caching in the rules cache a rule including the action received from the controller to handle future network connections having the obtained metadata; and
    handling the network connection in accordance with the action, wherein the controller is configured to:
maintain a plurality of rules that specify actions for handling network connections based on obtained metadata,
receive connection escalation requests from the endpoint agents,
match metadata received in the connection escalation requests with rules from the plurality of rules, and
reply to the connection escalation requests with responses including actions for handling network connections based on the matched rules.

27. The method of claim 26, wherein the host computer comprises a non-transitory computer readable medium encoded with instructions which, when executed by a processor on the host, cause the host computer to perform the method.

28. A method for gating computer network connections, the method performed by a controller executing on at least one server computer, the controller being in network communication with a plurality of endpoint agents, each endpoint agent executing on a host computer operating on a network, the method comprising:
maintaining a plurality of rules that specify actions for handling network connections based on obtained metadata;
receiving connection escalation requests from the endpoint agents;
matching metadata received in the connection escalation requests with rules from the plurality of rules; and
replying to the connection escalation requests with responses including actions for handling network connections based on the matched rules,
wherein each endpoint agent is configured to, for a respective network connection:
obtain metadata for the network connection,
determine whether the obtained metadata matches any rule in a rules cache maintained at the endpoint agent,
in response to determining that the obtained metadata does not match any rule in the rules cache, send a connection escalation request containing the obtained metadata to the controller to obtain an action for handling the network connection,
hold the network connection, preventing the passage of data, pending a response from the controller,
receive the response from the controller including the action for handling the network connection,
cache in the rules cache a rule including the action received from the controller to handle future network connections having the obtained metadata, and
handle the network connection in accordance with the action.

29. The method of claim 28, wherein the at least one server computer comprises at least one non-transitory computer readable medium encoded with instructions which, when executed by at least one processor on the at least one server computer, cause the at least one server computer to perform the method.

30. The computer security system of claim 1, wherein the action received from the controller comprises one of allowing the network connection, blocking the network connection, or redirecting the network connection, and wherein to handle the network connection in accordance with the action, the endpoint agent is configured to:
transmit an instruction to a firewall of the host computer to apply the action to the network connection.

* * * * *